United States Patent
Moriarty

(10) Patent No.: US 10,512,255 B2
(45) Date of Patent: Dec. 24, 2019

(54) FURNITURE PROTECTOR AGAINST CRAWLING ARTHROPODS

(71) Applicant: William Moriarty, Los Angeles, CA (US)

(72) Inventor: William Moriarty, Los Angeles, CA (US)

(*) Notice: Subject to any disclaimer, the term of this patent is extended or adjusted under 35 U.S.C. 154(b) by 122 days.

(21) Appl. No.: 15/730,374

(22) Filed: Oct. 11, 2017

(65) Prior Publication Data
US 2018/0220636 A1    Aug. 9, 2018

Related U.S. Application Data

(63) Continuation-in-part of application No. 14/671,867, filed on Mar. 27, 2015, now abandoned.

(51) Int. Cl.
| | | |
|---|---|---|
| *A01M 1/10* | (2006.01) | |
| *B25B 7/12* | (2006.01) | |
| *B25F 5/00* | (2006.01) | |
| *F15B 15/18* | (2006.01) | |
| *F15B 15/20* | (2006.01) | |
| *A01M 1/02* | (2006.01) | |
| *A01M 1/04* | (2006.01) | |
| *F15B 15/08* | (2006.01) | |
| *H01R 43/042* | (2006.01) | |

(52) U.S. Cl.
CPC .............. *A01M 1/103* (2013.01); *A01M 1/02* (2013.01); *A01M 1/04* (2013.01); *B25B 7/126* (2013.01); *B25F 5/005* (2013.01); *F15B 15/08* (2013.01); *F15B 15/18* (2013.01); *F15B 15/20* (2013.01); *F15B 15/202* (2013.01); *H01R 43/0427* (2013.01)

(58) Field of Classification Search
None
See application file for complete search history.

(56) References Cited

U.S. PATENT DOCUMENTS

| | | | |
|---|---|---|---|
| 6,378,242 B1* | 4/2002 | Roberts | A01M 29/34 248/346.11 |
| 9,066,511 B2* | 6/2015 | McKnight | A01M 1/026 |
| 9,451,761 B2* | 9/2016 | Messina | A01M 1/2011 |
| 2004/0237390 A1* | 12/2004 | Clop | A01G 9/029 47/32.7 |
| 2013/0318861 A1* | 12/2013 | Roeder | A01M 1/103 43/123 |
| 2014/0259879 A1* | 9/2014 | Logsdon | A01M 1/2011 43/114 |
| 2017/0251655 A2* | 9/2017 | Frutos | A01M 1/103 |

* cited by examiner

*Primary Examiner* — Sarah B McPartlin
(74) *Attorney, Agent, or Firm* — Larisa Migachyov

(57) ABSTRACT

A barrier device to prevent crawling arthropods such as bedbugs from accessing an item of furniture, said barrier device comprising a furniture riser, a deep fluid-filled moat, and a smooth wall around the moat.

14 Claims, 5 Drawing Sheets

FURNITURE PROTECTOR AGAINST CRAWLING ARTHROPODS

CROSS-REFERENCE TO RELATED APPLICATIONS

The present application is a continuation-in-part of U.S. application Ser. No. 14/671,867, filed Mar. 27, 2015, which claims benefit of U.S. Provisional Application No. 61/982,978, filed Apr. 23, 2014, which is herein incorporated by reference.

BACKGROUND

Field of the Invention

The present invention generally relates to pest control devices, and more specifically relates to barrier devices for protecting furniture against crawling arthropods.

Background of the Invention

Crawling arthropod pests such as *Cimes Lectularius* (bedbugs) are a major nuisance in everyday life. Considering how prevalent bedbug infestations are, there is a huge need for any devices and methods that can prevent, treat, or control such an infestation.

A commonly used trap design for crawling arthropods is a "pit fall" trap. Typically, such a pit fall trap has a gently gradated upward slope and a sharp drop into a "pit" area; the insect is expected to crawl up the upward slope and drop into the pit. Such traps are commonly used to prevent crawling arthropods from getting into pet food dishes, for example.

One flaw with such "pit fall" devices is that often, crawling arthropods do not voluntarily drop down into the confinement area or "pit"—instead, they find another way to access their goal. For example, if the device is used under a furniture support, for example a bed frame, the crawling arthropod can simply avoid the "pit fall" and find another way to gain access to its food source. For example, it could use bed sheets, blankets, or other furniture accessories that are in contact with both the furniture and the floor, to gain access to the furniture.

Another flaw of the "pit fall" devices is that when crawling arthropods do drop down into the confinement area or "pit" of the trap, they can often escape. Such devices incorporate smooth short interior walls, which can allow an insect to escape by either sinking its tarsal hooks into the side of the containment or "pit" wall and pull itself out, or by using the build-up of debris or other insects within the trap to find traction and climb out over an exterior or further interior wall and gain access to the furniture support.

A need therefore exists for a furniture protector that can effectively trap crawling arthropods such as bedbugs, prevent the crawling arthropods from escaping the trap once they are trapped, and prevent the crawling arthropods from circumventing the furniture protector and gaining access to the furniture by other means such as drapery, upholstery, bed linens, or other furniture accoutrements that are in contact with both the furniture and the floor.

SUMMARY OF THE INVENTION

An object of the present invention is to prevent crawling arthropods from accessing an item of furniture.

Another object of the present invention is to provide a device that traps crawling arthropods.

Another object of the present invention is to provide a device that traps crawling arthropods and prevents them from circumventing the device.

Another object of the present invention is to provide a device that traps crawling arthropods already present on an item of furniture and prevents them from accessing the item of furniture again.

The barrier device of the present invention comprises a riser, wherein the riser has a top surface, a side surface, and a bottom edge. The top surface and the plane that passes through the bottom edge are horizontal; the side surface forms an angle between 60 and 90 degrees with a horizontal plane, in such a way that the cross-sectional area of the bottom edge is larger than the area of the top surface. A moat wall is attached in a watertight way to the riser bottom edge. The moat wall is high enough to create a moat of no less than 3" in depth, and the angle of the moat wall and the plane of the riser bottom edge is between 90 and 120 degrees. A fluid fills the moat to the depth of at least 3".

In the preferred embodiment, the riser side surface, moat wall outer surface, and moat wall inner surface have a surface roughness of 0.9 microns or less.

In an embodiment, the riser side surface is coated with a slippery substance. The slippery substance may be a powder or a liquid.

In an embodiment, the fluid in the moat may be water, oil, sugared water, soapy water, grease, gel alcohol, or glycerol based liquid.

In an embodiment, the barrier device further comprises at least 3 crenellations attached to the top surface of the riser, each crenellation between 0.5 and 2 inches in height, with at least 0.5 inches of space between crenellations.

In an embodiment, the barrier device further comprises a circular hole in the top surface of the riser located at the center of the top surface of the riser, wherein the diameter of the circular hole is at least 0.5".

In an embodiment, the riser is hollow and a plurality of ribs are attached to the inside surface of the riser.

In an embodiment, at least one surface of the barrier device is red; in another embodiment, at least one surface is grey; and in another embodiment, none of the surfaces are white or yellow.

In an embodiment, a lighting element is attached to the barrier device in such a way that it is visible from a distance; the lighting element produces light with a wavelength between 520-590 nm. A controller for the lighting element causes the lighting element to flash intermittently at random intervals.

In an embodiment, a pheromone that attracts at least one species of crawling arthropods is applied to the side surface of the riser, the wall, or the fluid in the moat.

LIST OF FIGURES

DETAILED DESCRIPTION OF THE PREFERRED EMBODIMENT

For purposes of the present disclosure, a "piece of furniture" or a "furniture item" is any furniture that may need to be protected against bedbugs or other crawling arthropods. For example, such furniture items may be couches, beds, armchairs, chairs, loveseats, cribs, and other soft furniture items; dressers, wardrobes, and other furniture items containing clothing or other soft goods; tables and kitchen furniture that may need to be protected against crawling arthropods that may otherwise get into food items placed on the furniture; and any other furniture item that may need to be protected against crawling arthropods such as bedbugs, ants, cockroaches, and other pests.

For purposes of the present disclosure, an "arthropod" or a "crawling arthropod" is an insect pest incapable of flight, such as a bedbug or an ant. Cockroaches, even though they are capable of brief flight, are also included in the current definition of "arthropod" as a special case.

Figure 1:
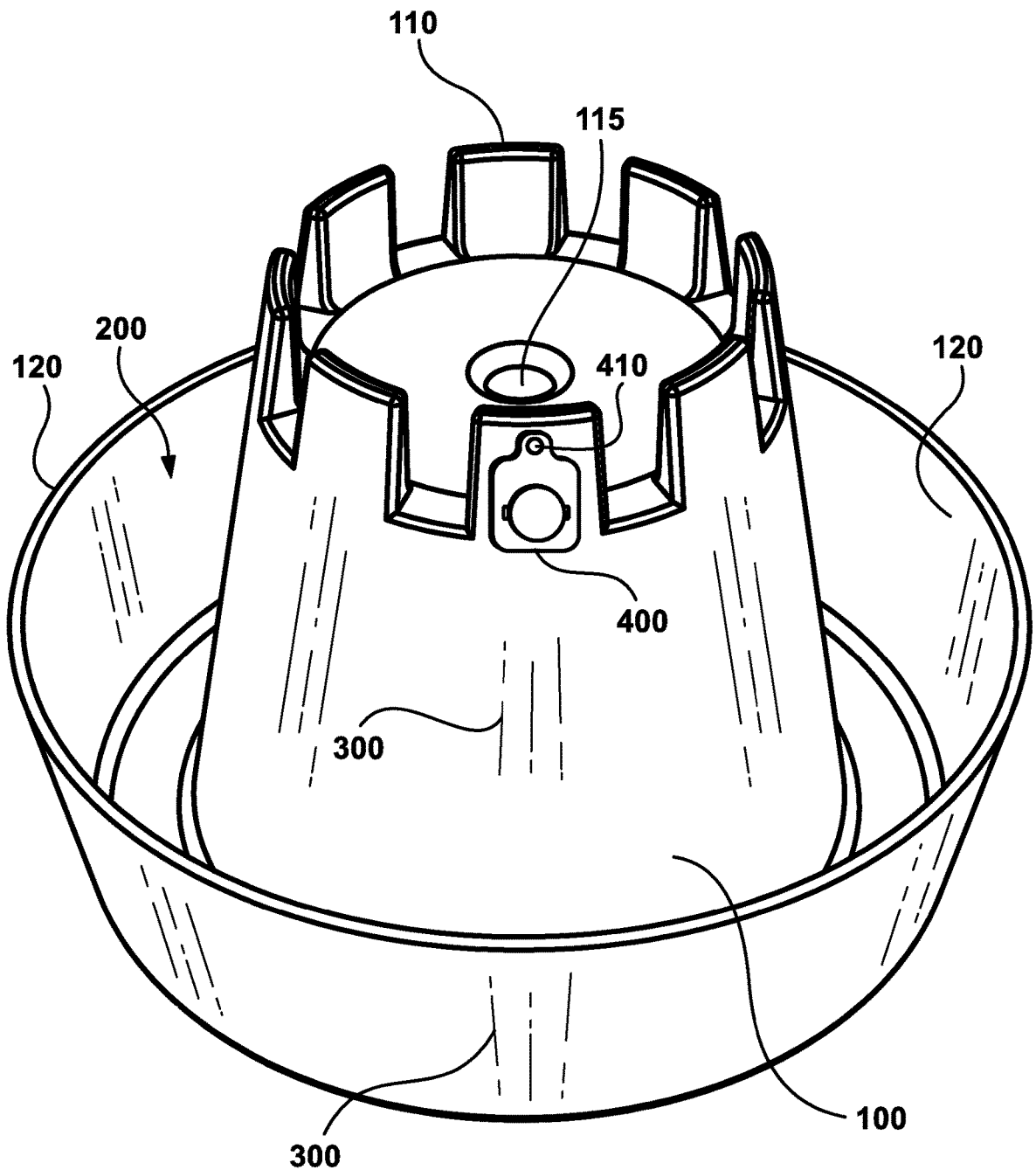
FIG. 1 shows the preferred embodiment of the present invention.

FIG. 1 shows the preferred embodiment of the present invention. Riser 100 is a plastic hollow riser with a circular cross-section, preferably made of ABS, polyethylene, or any other plastic capable of supporting the weight of a piece of furniture. Wall 120 is connected to the bottom edge of the riser in a hermetically sealed, waterproof manner. All the surfaces of the wall and the riser are preferably smooth. Preferably, the surface roughness of the wall and the riser is a mirror finish (0-50 microinches) or a satin finish (50-60 microinches). A liquid (not shown in this Figure) is present between the surface of the riser 100 and the wall 120. In the preferred embodiment, the liquid is at least 3" deep, as will be discussed below.

The riser of the present invention thus prevents arthropods from accessing furniture in several ways. First of all, the smooth surface of the outer wall prevents an arthropod from crawling up it to access the furniture. If an arthropod does manage to make it to the top of the outer wall somehow, it drops into the moat and drowns in the liquid. And in the impossible case that the arthropod does manage to swim across the liquid, it will be unable to crawl up the smooth surface of the riser to get to the furniture item. Furthermore, the riser raises the furniture item high enough that arthropods cannot use other routes (such as hanging bedclothes) to get onto the furniture item. Finally, any arthropods that are already present on the furniture item will occasionally get onto the riser and slide down into the moat to drown in the liquid.

As can be seen from the Figure, the riser's surface is angled. The interior angle of the riser is preferably less than 90 degrees but not less than 60 degrees, in order to sustain the weight of the furniture and provide stability.

A lip 110 is present around the top of the top surface of the riser to facilitate alignment and stability of a piece of furniture placed on the riser. As shown in the Figure, in the preferred embodiment, the lip is crenellated, leaving at least 0.5 inches of space between each crenellation. The crenellations are preferably between 0.5-2 inches in height and thick enough to prevent bending or breaking. This enables rectangular furniture legs to be supported, even if the diagonal of the rectangular furniture leg slightly exceeds the diameter of the riser. Since most furniture legs are rectangular, this is an important feature of the preferred embodiment of the present invention. However, it will be understood that in other embodiments, the lip may be continuous or not present at all.

A hole 115 is present in the center of the top surface of the riser. The hole is preferably circular and at least 0.5 inches in diameter. The purpose of the hole is to allow a peg to be used to align the furniture leg to the riser to prevent slippage or misalignment; some furniture legs comprise holes for pegs to be used in this manner. The hole, as shown in the Figure, preferably comprises a depth that is less than the length of a typical furniture peg (in the preferred embodiment, the depth of the hole is 2 inches) to prevent the peg from slipping all the way through the hole and falling out.

The riser may be any height as long as it raises the piece of furniture to a sufficient height to keep bedclothes and other hanging items from touching the floor, while still leaving the piece of furniture usable. Typically, a height between 3"-8" is sufficient, though other heights may also be possible, depending on the piece of furniture and how it is used.

The cross-sectional area of the bottom of the riser is preferably larger than the cross-sectional area of the top of the riser, to improve stability. In the preferred embodiment of the present invention, the internal angle of the riser wall (i.e. the angle between the horizontal plane and a plane tangent to the riser wall surface) is between 60° and 90°, and less than 90°. A vertical riser wall would not provide enough stability to prevent toppling; it is important for the wall to be slightly angled and for the cross-sectional area of the bottom of the riser to be larger than the cross-sectional area of the top riser.

The wall 120 may be cliffed (i.e. extending outward at an angle), concave, or (as in the preferred embodiment) both. A cliffed outer wall makes it very hard for an arthropod to even start their climb up it, since they would have to maintain an upside-down climb up a smooth surface. A concave outer wall further prevents an arthropod from climbing up, since it would have to climb through the curve of the wall, which is difficult for most arthropods due to their inability to effectively bend their abdomens and thoraxes. In the preferred embodiment, the angle of the cliffed outer wall is between 90° and 120° with the horizontal.

The side surface of the riser may be coated with a fluid or lubricating powder substance to increase its slipperiness. Such substances may be graphite powder, oil, glycerin, grease, or any other substances that are used to decrease friction. The coating is preferably nontoxic to humans or household pets and non-staining.

In the preferred embodiment, the riser has a circular cross-section, as shown in the Figure; however, it may also have a rectangular or square cross-section or any other shape of cross-section as long as the top surface of the riser can accommodate a typical furniture leg and the bottom surface of the riser is stable on the ground.

Figure 2:
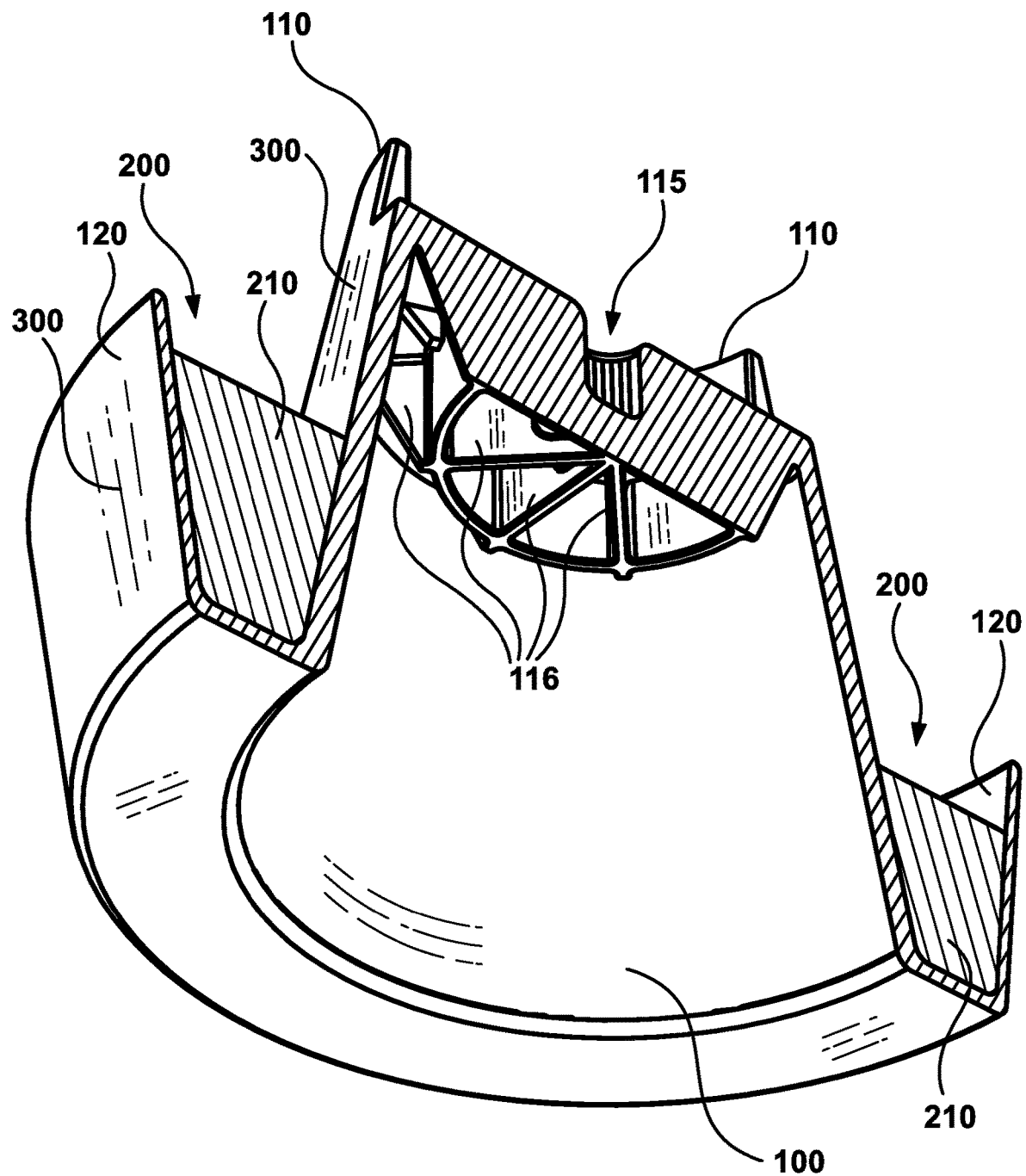
FIG. 2 shows a cross-sectional view of the preferred embodiment of the present invention.

FIG. 2 shows a cross-sectional view of the preferred embodiment of the present invention. As shown in the Figure, moat 200 fills the space between the wall 120 and the riser 100. In the preferred embodiment, the moat 200 is deep enough so that crawling arthropods cannot get through it even after a significant quantity of dead arthropods are in the moat already. This is a problem with fluid barrier devices in the prior art; most such fluid barrier devices do not provide a barrier anymore after a certain number of dead arthropods are already drowned in the fluid. The moat of the present invention is sufficiently deep that it can remain effective for a much longer time; in the preferred embodiment, the depth of the moat is at least 3 inches. As noted above, the riser and the interior of the wall are preferably smooth (as described above) so that crawling arthropods cannot climb out of the moat.

Figure 5:
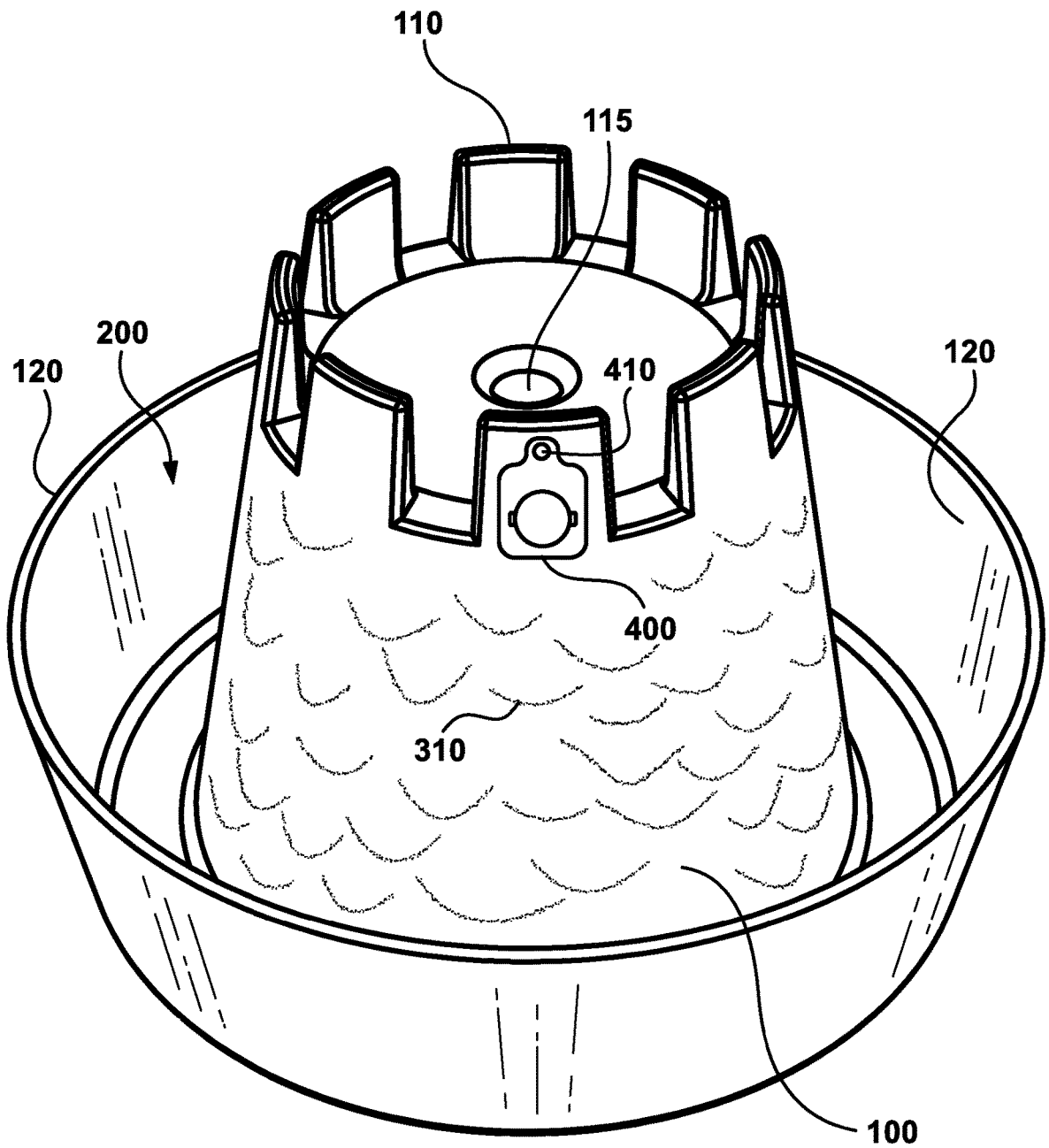
FIG. 5 shows a view of an alternate embodiment of the furniture riser of the present invention.

The moat can be filled with any fluid, though it should preferably be nontoxic to humans or household pets and non-staining in case of spills. In the preferred embodiment, the fluid is water. Soap may be added to the water to decrease surface tension and make it easier for the crawling arthropods to drown. In an alternate embodiment, sugar is added to the water to make it more attractive to the crawling arthropods. In an alternate embodiment, alcohol may be used, as it has a lower surface tension. In another embodiment, oil or grease may be used to increase the chances that a crawling arthropod would be unable to climb out of the liquid. A gel or glycerol-based liquid may also be used. The oil, grease, or glycerol gel may also be used to coat the riser surface to prevent arthropods from crawling up the surface even if they do manage to float across the moat. FIG. 5 shows a slippery coating 300 used to coat the riser surface.

FIG. 2 also shows supporting ribs 210 on the inside of the riser 100. Since furniture, especially beds, tends to be heavy and to be designed to bear the weight of one or more people, it is important for the riser 100 to be able to support at least 200 lbs. of weight. Assuming a large bed weighs approximately 600 lbs, and has two 200-lb. people sleeping on it, and has 4 legs, each leg would therefore be supporting 250 lbs. of weight. Thus, the riser 100 comprises ribs 210 on the interior of the riser to enable it to support such a weight. The ribs 210 may be straight or curved. In the preferred embodiment, as shown in the Figure, the ribs are curved to reduce weight and improve structural support.

While the preferred embodiment of the device is made of ABS plastic, other materials may also be used, such as plastic, metal, or wood, as long as the material is waterproof and has a smooth enough finish to prevent crawling arthropods from crawling out of the moated section. Similarly, while the preferred embodiment of the device is hollow, the present invention does not require it. The riser may be a solid piece of wood, plastic, or metal.

In an embodiment, the riser may be stackable, and several of these risers may be stacked together to increase the height of the device. In such a situation, all the moats may be filled with a fluid, or only the top moat may be filled.

Crawling arthropods are generally attracted to shades of red, and dislike white and yellow. In an embodiment, the furniture riser is colored in a way that makes it attractive to crawling arthropods. Bedbugs and fleas are especially attracted to shades of red, particularly Pantone #185. In an embodiment, all the visible surfaces of the furniture riser are colored in this shade of red. Other shades of red that are attractive to crawling arthropods are Pantone #163, 169-171, 176-217, 707-711, 1788-1805, 1925-1945, and colors made by mixing any of those colors.

Crawling arthropods also like grey colors. In another embodiment of the invention, the furniture riser is colored grey (Pantone #427). While grey is not specifically attractive to crawling arthropods in the same way that red is, it is not as off-putting to them as white or yellow, making it less likely that they will avoid the furniture riser. Other possible shades of grey include #207, 263, 400-418, 420-425, 427-435, and 441-447.

In an embodiment, both red and grey are used for coloring the present invention. In another embodiment, other colors are used, but white and yellow colors are not used, since those colors tend to repel arthropods.

Figure 3:
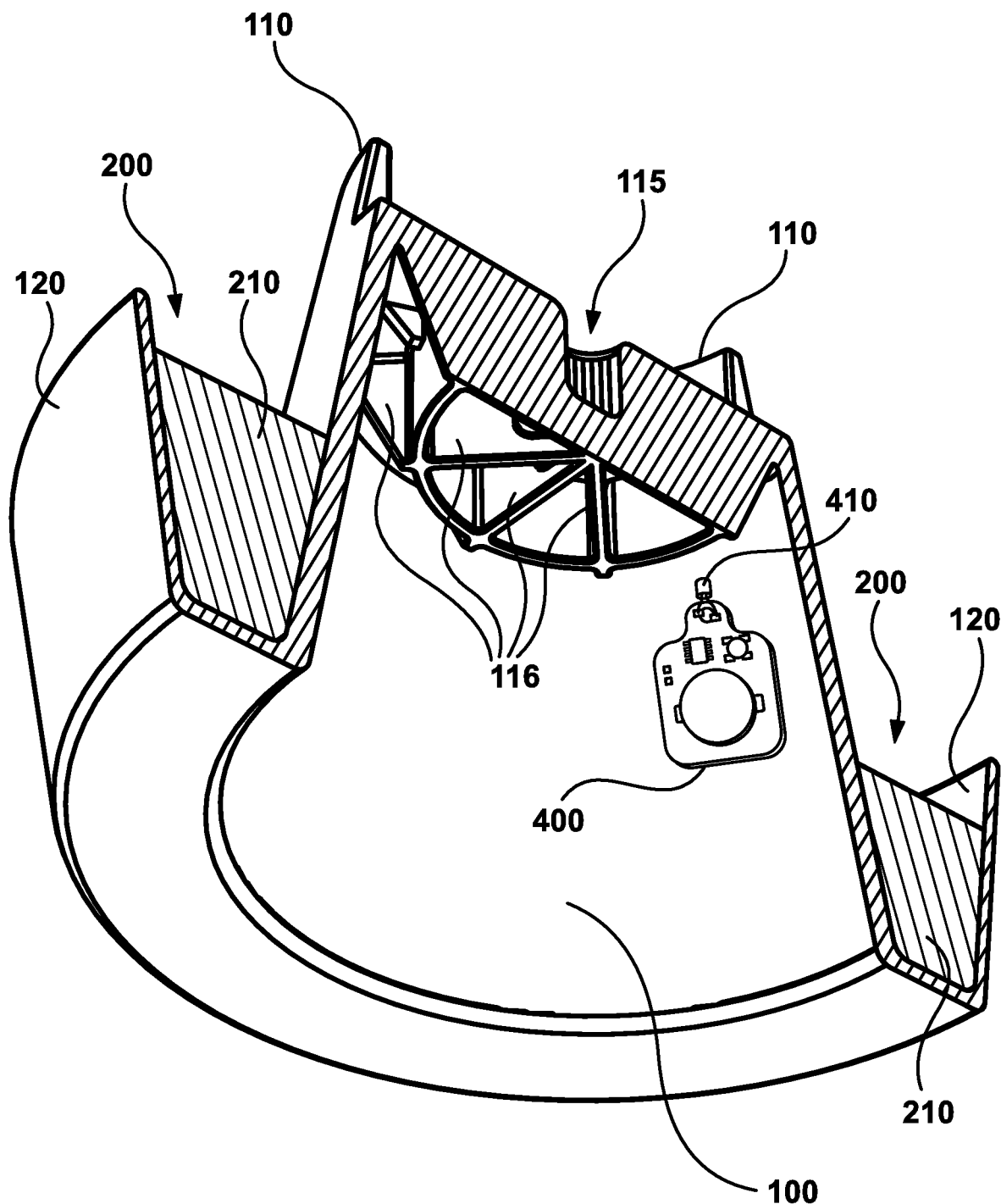
FIG. 3 shows a view of an alternate embodiment of the furniture riser of the present invention.
Figure 4:
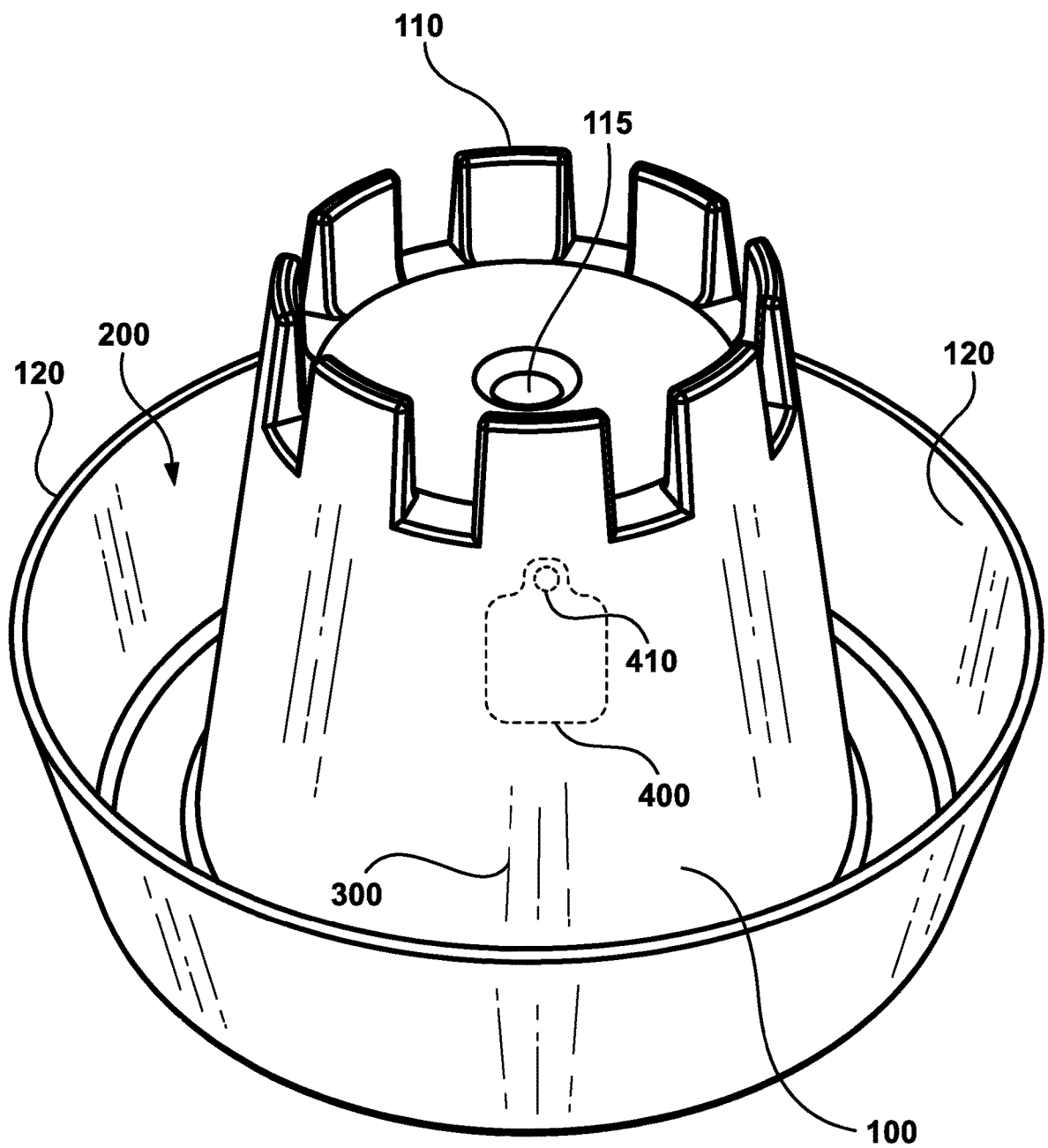
FIG. 4 shows a view of an alternate embodiment of the furniture riser of the present invention.

Some arthropods, such as fleas, are attracted to light. In an embodiment, the furniture riser comprises a light of a wavelength that is most attractive to a particular species of arthropod. Since bedbugs, in particular, are attracted to the green-yellow spectrum of light, the wavelength range of this light source is preferably between 495 nm-590 nm. Such a light may be an LED, a light bulb, luminescent paint, or any other light-emitting device or module that can emit sufficient light of the right frequency to attract an arthropod. The light may be attached to one of the crenellations, affixed on the interior of the riser and visible through a hole in the riser or in a crenellation. The light may be controllable (i.e. able to be turned on and off) by a remote control, by motion, or manually. FIG. 1 shows the light 400 attached to a crenellation. In FIG. 3, the light 400 is attached to the interior of the riser, and FIG. 4 shows the light 400 visible through a translucent surface of the riser. In FIG. 5, the light is attached to the outside of a crenellation. The light preferably comprises an LED bulb 410 and a control module.

In the preferred embodiment, the light flashes in a random intermittent way—i.e. no steady pattern to the flashes. This is intended to better attract arthropods, since many arthropods (bedbugs included) see intermittent unsteady flashes as indication of prey.

Since bedbugs are not specifically attracted to heat, it is irrelevant as to whether the light source of the present invention produces any heat. In the preferred embodiment, a light source that generates no heat is preferred, to avoid wasting energy.

Some arthropods are attracted to pheromones. In an embodiment, the furniture riser comprises a pheromone 300 that is designed to attract a particular species of crawling arthropods. In an embodiment, multiple pheromones may be present to attract multiple species of crawling arthropods. The pheromones may be added to the fluid in the moat or may be used to coat the material of the wall or the riser.

Exemplary embodiments are described above. It will be understood that the present invention encompasses other equivalents that are apparent to one of reasonable skill in the art, and is limited only by the appended claims.

The invention claimed is:

1. A crawling arthropod barrier device, comprising:
   a riser, said riser having a riser top surface, a riser side surface, and a riser bottom edge, wherein the riser top surface is at least 3" from the riser bottom edge, wherein an angle between a plane that passes through the riser bottom edge and the riser side surface is less than 90 degrees and not less than 60 degrees, wherein the riser can support a weight of at least 200 lbs. on the riser top surface;
   a moat wall, said moat wall attached to the riser bottom edge in such a way as to be watertight, wherein the moat wall is high enough to create a moat of not less than 3" in depth, wherein an angle between the moat wall and the plane that passes through the riser bottom edge is more than 90 degrees but less than 120 degrees, said moat wall comprising an outer surface and an inner surface;
   a fluid filling the moat to a depth of at least 3".

2. The crawling arthropod barrier device of claim 1, wherein the riser side surface has a surface roughness of 0.9 microns or less.

3. The crawling arthropod barrier device of claim 1, wherein the moat wall outer surface and inner surface have a surface roughness of 0.9 microns or less.

4. The crawling arthropod barrier device of claim 1, wherein the riser side surface is coated with a slippery substance.

5. The crawling arthropod barrier device of claim 4, wherein the slippery substance is one of the following group: a lubricating powder or liquid.

6. The crawling arthropod barrier device of claim 1, wherein the fluid is one of the following group: water, oil, sugared water, soapy water, grease, gel, alcohol, glycerol based liquid.

7. The crawling arthropod barrier device of claim 1, further comprising:

at least 3 crenellations attached to the top surface of the riser, said crenellations being between 0.5 and 2 inches in height, with at least 0.5 inches of space between crenellations.

8. The crawling arthropod barrier device of claim 1, further comprising:
a circular hole in the top surface of the riser located at the center of the top surface of the riser, the diameter of the circular hole being at least 0.5".

9. The crawling arthropod barrier device, of claim 1, wherein the riser is hollow, wherein the riser comprises an outside surface and an inside surface, further comprising:
a plurality of ribs attached to the inside surface of the riser.

10. The crawling arthropod barrier device of claim 1, wherein at least one surface of the device is red.

11. The crawling arthropod barrier device of claim 1, wherein at least one surface of the device is gray.

12. The crawling arthropod barrier device of claim 1, wherein none of the surfaces of the device are white or yellow.

13. The crawling arthropod barrier device of claim 1, further comprising:
a lighting element attached in such a way that it is visible from a distance, wherein the lighting element produces light with a wavelength between 520-590 nm;
a controller for the lighting element, wherein the controller causes the lighting element to flash intermittently at random intervals.

14. The crawling arthropod barrier device of claim 1, further comprising:
a pheromone that attracts at least one species of crawling arthropods, said pheromone applied to one of the following group: the side surface of the riser, the moat wall, the fluid in the moat.

* * * * *